(12) United States Patent
Haeussler et al.

(10) Patent No.: US 6,682,154 B1
(45) Date of Patent: Jan. 27, 2004

(54) METHOD AND DEVICE FOR MODELING A HYDRAULIC SYSTEM AND BRAKE FORCE REGULATING SYSTEM

(75) Inventors: Alexander Haeussler, Stuttgart (DE); Helmut Wiss, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 09/463,925

(22) PCT Filed: Feb. 6, 1999

(86) PCT No.: PCT/DE99/00325
§ 371 (c)(1),
(2), (4) Date: May 8, 2000

(87) PCT Pub. No.: WO99/64279
PCT Pub. Date: Dec. 16, 1999

(51) Int. Cl.$^7$ .................................................. B60T 8/66
(52) U.S. Cl. ........................ 303/166; 303/167; 303/174; 303/DIG. 1; 303/DIG. 4; 303/113.4
(58) Field of Search ............................. 303/113.1, 166, 303/167, 174, DIG. 1, DIG. 2, DIG. 3, DIG. 4, 113.4, 121, 155, 160

(56) References Cited

U.S. PATENT DOCUMENTS 5,545,929 A * 8/1996 Fijioka et al. .............. 303/166
5,662,388 A    9/1997 Wuerth et al.
5,683,149 A * 11/1997 Aizawa et al. .......... 303/166 X

FOREIGN PATENT DOCUMENTS

| DE | 34 04 135 | 8/1985 |
| DE | 40 30 724 | 4/1992 |
| DE | 43 40 921 | 6/1995 |
| JP | 04 345564 | 4/1993 |
| JP | 05 004572 | 5/1993 |

* cited by examiner

Primary Examiner—Christopher P. Schwartz
Assistant Examiner—Melanie Torres
(74) Attorney, Agent, or Firm—Kenyon & Kenyon

(57) ABSTRACT

A method and/or a device for estimating pressure and/or volume changes in a hydraulic system having two peripheral volume storage vessels connected to a central volume storage vessel, in which, to increase the response rate, the estimate is based at least at times on a model in which a direct connection to the peripheral volume storage vessels is assumed, regardless of whether or not the peripheral volume storage vessels are simultaneously connected directly to each other.

20 Claims, 4 Drawing Sheets

METHOD AND DEVICE FOR MODELING A HYDRAULIC SYSTEM AND BRAKE FORCE REGULATING SYSTEM

FIELD OF THE INVENTION

The present invention relates to a method and/or a device for modeling a hydraulic system having two peripheral volume storage vessels, each of which is connected to a central volume storage vessel by a valve, based on a hydraulic model, i.e., a method for estimating pressure and/or volume changes in this system in response to external changes.

BACKGROUND INFORMATION

Modeling methods of this type may be used in braking force control or anti-skid systems for motor vehicles. German Published Patent Application No. 43 40 921, German Published Patent Application No. 40 12 167, and German Published Patent Application No. 40 30 724 concern braking force control system of this type.

The brake system of a motor vehicle forms a hydraulic system with a brake master cylinder, to which a delivery pump may be connected, brake chambers in the vehicle wheels, and a cable system, referred to as the brake circuit, which includes a pressure line connecting a changeover valve at the output of the brake master cylinder to intake valves of the brake chambers. The wheel brake chambers can be viewed as peripheral volume storage vessels and the pressure line as a central volume storage vessel of the hydraulic system.

The braking force control system is an electronic arrangement that operates in cycles and uses sensors to detect the pressure in the brake master cylinder as well as the motive characteristics of the wheels, and, by driving the valves located in the brake circuit between the brake master cylinder and the wheel brake chambers, tries to set a braking pressure at which desired motive characteristics of the wheels, such as rotational speed or slip, can be achieved as accurately as possible. The valves connecting the brake master cylinder to the wheel brake chambers can be controlled independently of one another, and situations can arise in which the pressures present in the pressure line of the brake circuit and in two wheel brake chambers differ from one another.

To control the motive characteristics of the wheels in the desired manner, it must be possible to estimate the pressure building up in the wheel brake chambers as a result of a pressure change in the pressure line of the brake circuit. Because the control arrangement operates in cycles, it can detect new values for the parameters to be taken into account only at certain intervals.

The control action performed by the arrangement must remain oriented toward these parameter values until new values are available; in fact, the values of these parameters change continuously between two detection times. Systematic control errors are the result.

In a hydraulic system like the one illustrated schematically in FIG. 2, this has an effect in particular on the modeling of situations in which different pressures $p_1$, $p_1$ prevail in the wheel brake chambers, i.e., peripheral volume storage vessels 1, 2, where $p_1 < p_2$ is assumed. When pressure $p_3$ is present in the pressure line, i.e., in central volume storage vessel 3, at interval $[p_1, p_2]$, the result in a real system is a volumetric flow through open valves 5, 6 from higher-pressure wheel brake chamber 2 to lower-pressure wheel brake chamber 1 via pressure line 3 located between them. Conventional hydraulic models are unable to account for this pressure. They calculate a volumetric flow $q_{13}$ between storage vessels 1 and 3, based on pressure values $p_1$ and $p_3$ present at the beginning of a model duty cycle, as well as a volumetric flow $q_{13}$ between storage vessels 2 and 3, based on pressure values $p_2$ and $p_2$. It is not possible to account for the influence of volumetric flow $q_{13}$ on volumetric flow $q_{23}$ and vice versa during the duty cycle.

The problem becomes particularly apparent, for example in the case of $p_1 = p_3 < p_2$. In this situation, the conventional model does not show any volumetric exchange between storage vessels 1 and 3 during the first cycle. The model treats volumetric flow $q_{23}$ from wheel brake chamber 2 to pressure line 3 as though it had remained stored in the pressure line during this cycle. The pressure increase that this produces in pressure line 3 does not yield a volumetric flow into wheel brake chamber 1 until the next cycle. At the same time, ignoring the volumetric outflow from pressure line 3 to wheel pressure chamber 1 means that an unrealistically high pressure is assumed in the central storage vessel during the next cycle, and the calculated volumetric flow from storage vessel 2 to storage vessel 3 is consequently too low. The model lags behind the actual situation, which impairs the quality of the model and consequently also the quality of a pressure control system in the brake chambers based on the model. This problem is particularly disturbing when the volume of the central storage vessel is smaller than the volume of the peripheral storage vessels. This occurs regularly when the central storage vessel is a line, as in the situation discussed here. In this case, namely, a very small exchanged volume is apparently sufficient to equalize the pressure difference between the peripheral volume storage vessel with the higher pressure and the central volume storage vessel in the model, and the calculation according to the model correspondingly supplies only a small value for the exchanged volume. The actual volume to be exchanged between the peripheral storage vessels to equalize the pressure can, however, be much higher, which means that the model moves toward correct pressure values only very slowly.

SUMMARY OF THE INVENTION

An object of the present invention is to provide a method and/or a device for estimating pressure and/or volume changes in a hydraulic system having two peripheral volume storage vessels connected to a central volume storage vessel, with the system being able to respond faster to pressure differences between the peripheral volume storage vessels than known methods. In particular, a method and/or a device is provided that makes it possible to account for such differences as early as the duty cycle in which they are first detected.

This object may be achieved by, using a method and/or a device for estimating pressure and/or volume changes based on a hydraulic model in a hydraulic system having two peripheral volume storage vessels, each of which is connected to a central volume storage vessel by a valve, the estimate is based at least at times on a model in which a direct connection to the peripheral volume storage vessels exists, regardless of whether the peripheral volume storage vessels are simultaneously connected directly to each other. This method can also be applied to hydraulic systems in which a direct connection between the peripheral storage vessels, e.g., using a valve, can be established as well as systems which do not have a connecting capability of this type.

The method is carried out in cycles, whereby preferably in each cycle:

a) the pressure is detected in each volume storage vessel;
b) for each peripheral volume storage vessel, a volumetric flow between this peripheral volume storage vessel and the central volume storage vessel is calculated on the basis of a pressure difference between this peripheral volume storage vessel and the central volume storage vessel;
c) if the direct connection between the peripheral volume storage vessels is used, a volumetric flow between the peripheral volume storage vessels is calculated on the basis of a pressure difference between the peripheral volume storage vessels;
d) the pressures at the end of the cycle are estimated on the basis of the calculated volumetric flows.

Each volumetric flow is suitably calculated in step b) on the basis of the volume coefficient or volume resistance of the valve through which the corresponding flow passes. The volumetric flow over the "fictitious" connection between the peripheral volume storage vessels is calculated in step c), preferably on the basis of the total volume resistances of the valves connecting the peripheral volume storage vessels and the central volume storage vessel.

Figure 1:
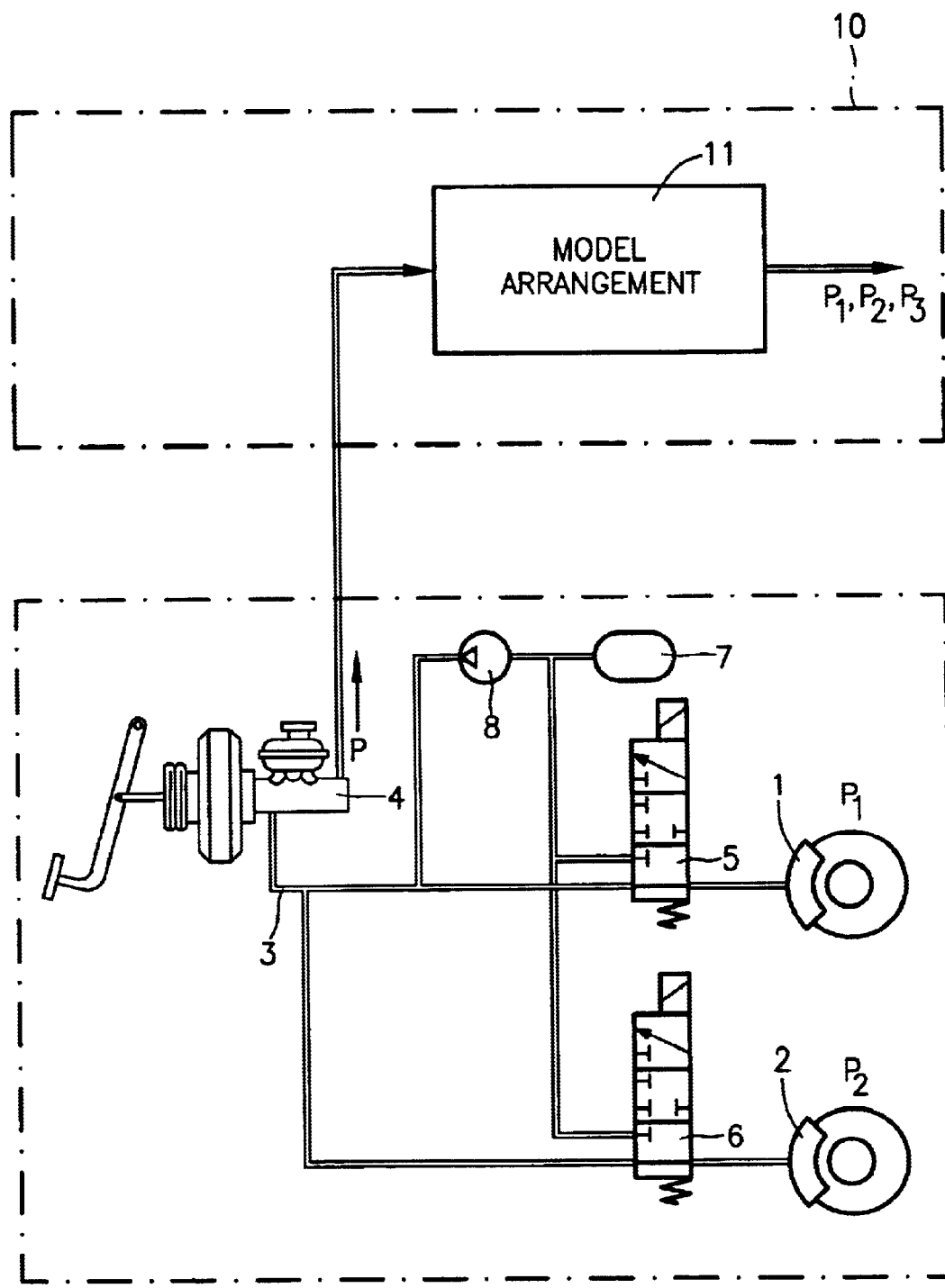
FIG. 1 shows a hydraulic system of a motor vehicle.

The hydraulic system shown in FIG. 1 is part of a brake system of a motor vehicle. It includes a brake master cylinder 4, a pressure line 3 as the central volume storage vessel, and four wheel brake chambers as peripheral volume storage vessels, only two of which (1, 2) are illustrated in the figure. Pressure line 3 extends from brake master cylinder 4 to three-position valves 5, 6, each of which is assigned to one of the wheel brake chambers and which connect pressure line 3 to wheel brake chamber 1 or 2 in a first position, are closed in a second position, and connect the assigned wheel brake chambers to a brake fluid reservoir 7 in their third position. A pump 8 delivers brake fluid from the reservoir back to the brake master cylinder.

A control system 10 includes a model arrangement 11, whose function is to estimate pressures $p_1$, $p_2$ and $p_3$ in the wheel brake chambers and the pressure line on the basis of a model for the duration of one braking action. It uses measurement value p of the pressure in brake master cylinder 4 for this purpose. This estimate serves as the basis for a subsequent calculation of those opening times of three-position valves 5, 6, which ensure that optimum braking pressures are present in the wheel brake chambers.

Figure 2:
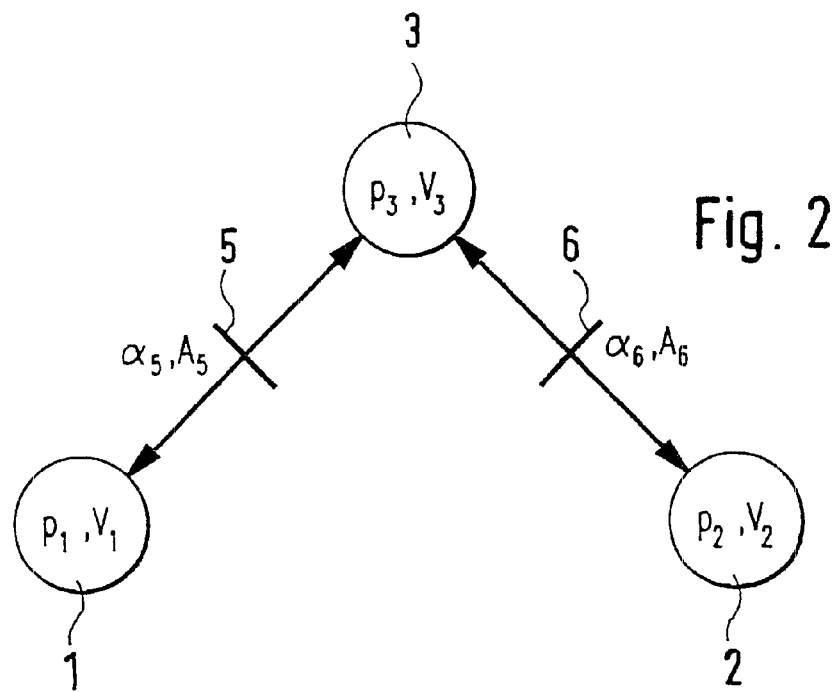
FIG. 2 shows a model of the hydraulic system.

The model illustrated in FIG. 2 of the hydraulic system from FIG. 1 has already been discussed above. It has the same geometric structure as the real hydraulic system: volume storage vessels 1, 2, 3—characterized by their pressures and volumes $p_1$, $p_2$, $p_3$ and $v_1$, $v_2$, $v_3$, respectively—are connected by valves 5, 6, which are characterized by their respective aperture coefficients $\alpha_5$, $\alpha_6$ and cross-sectional areas $A_5$, $A_6$. The volumetric flow between the central and peripheral volume storage vessels can be calculated on the basis of the Bernoulli Formula:

$$q_{3i}=\alpha_j{}^*A_j{}^*(2/\rho)^{1/2*}(p_3-p_1)^4$$

where i, j=1, 5 or 2, 6 and $\rho$ is the density of the brake fluid.

DETAILED DESCRIPTION

Figure 3:
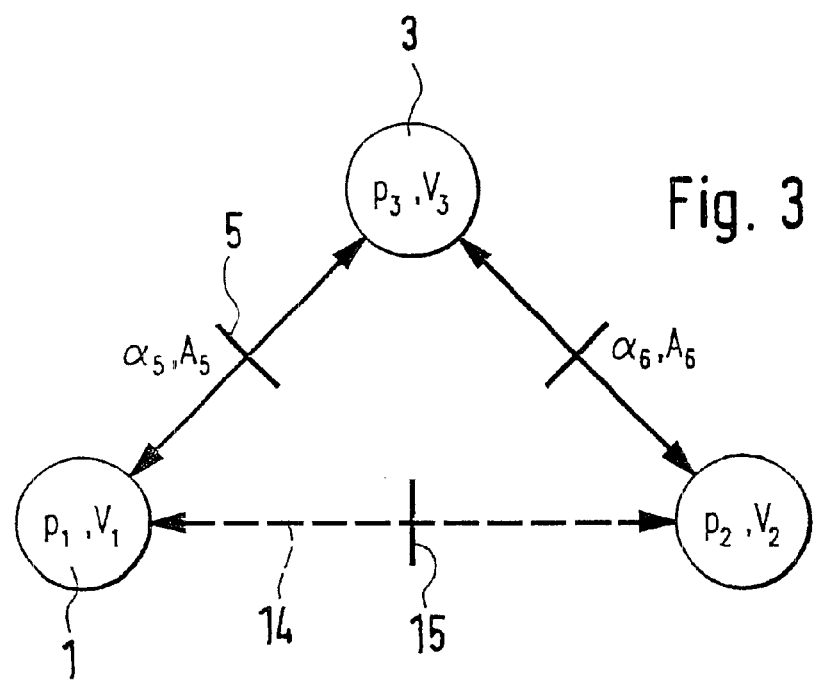
FIG. 3 shows a model of the hydraulic system according to the present invention.

FIG. 3 shows the model used in the method according to the present invention. It includes the same components as the model illustrated in FIG. 2, which have the same reference numbers and are not described again here. In addition, "fictitious" direct connection 14 between both peripheral storage vessels 1 and 2 is provided in the model shown in FIG. 3. Fictitious valve 15 in this line is always assumed to be open when both real valves 5 and 6 are open, i.e., when a volume exchange can occur between peripheral storage vessels 1, 2 via central storage vessel 3. The flow resistance to which a volumetric flow on the fictitious line is exposed corresponds to the overall flow resistance of the real hydraulic system between two peripheral storage vessels 1, 2, which approximates the overall flow resistance of valves 5, 6. The Bernoulli Formula in the following form:

$$q_{12}=(1/\alpha A_5 A_5+1/\alpha_6 A_6)^{-1*}(2/\rho)^{1/2*}(p_1-p_2)^{1/2}$$

is therefore used to model the volumetric flow between storage vessels 1 and 2.

Figure 4:
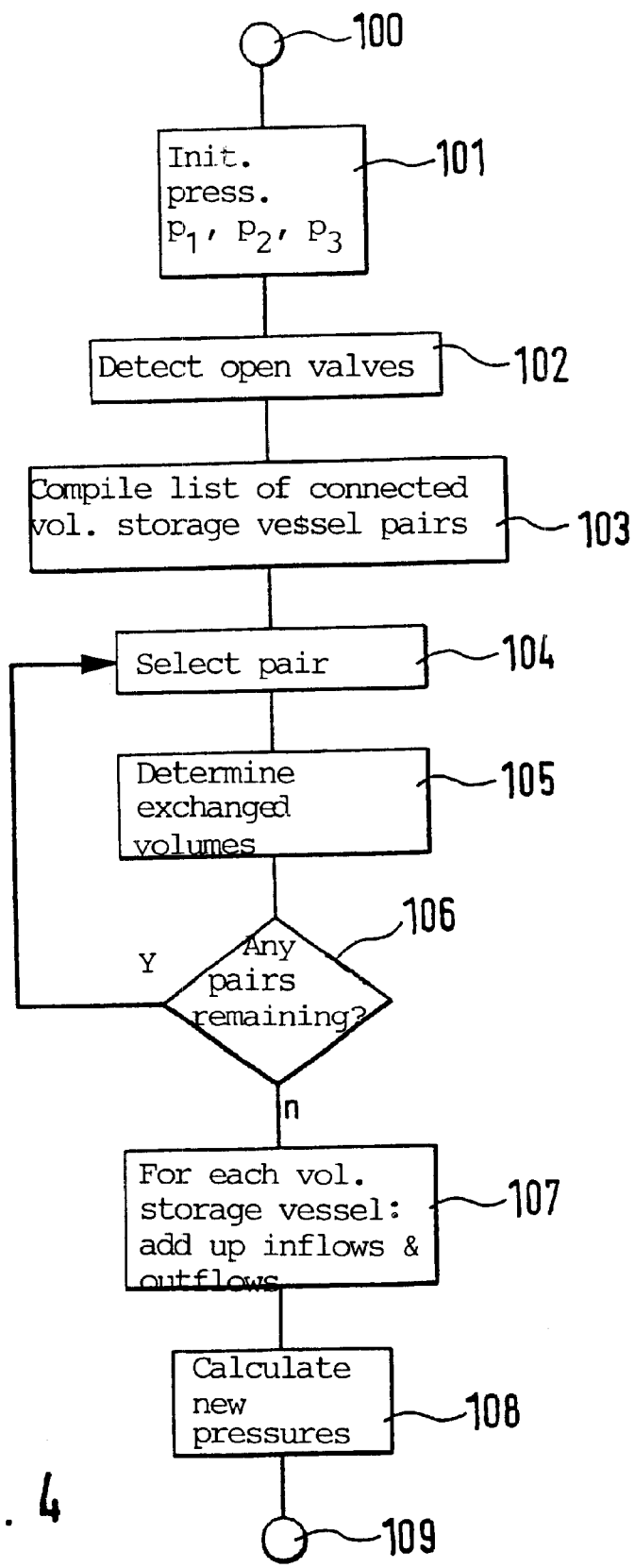
FIG. 4 shows a flowchart of a method according to the present invention.

FIG. 4 shows a detailed flowchart of a method according to the present invention. Before a braking action begins, the pressures in the brake circuit and wheel brake chambers are equal to the pressure in the brake master cylinder and can be assumed to equal 0 (atmospheric pressure). In a first step 101 of the method, the model arrangement therefore assigns equal initial pressures $p_1$, $p_2$, $p_3$ to volume storage vessels 1, 2, 3. It subsequently determines which of valves 5, 6 is open (step 102). During an initial phase of the braking action, when the pressure is building up in the wheel brake chambers, all valves 5, 6 are generally open. During a later phase, when the braking force control system intervenes in the braking action, at least one of the valves is generally closed to limit the braking force of the assigned wheel. The model arrangement uses this information in step 103 to compile a list of all volume storage vessel pairs that are connected to each other. If all valves are closed, the list is empty. If, for example, only valve 5 is open, the list contains pair (1, 2). If both valves are open, the list contains pairs (1, 2), (1, 3), and (2, 3).

Each pair in the list is selected, in turn, in a loop involving steps 104 to 106, and the volume exchanged between the storage vessels is calculated (step 105) on the basis of the pressures determined in step 101 according to the Bernoulli Formula of volumetric flow between the storage vessels of the pair by multiplying this figure by the cycle duration (or possibly the length of time the assigned valve is open, if this is shorter than the cycle duration).

After all pairs have been processed in this manner, the total inflow and outflow volumes are calculated for each volume storage vessel in step 107. In step 108, the volume of the storage vessel at the end of the cycle is then determined for each volume storage vessel on the basis of a known initial volume at the beginning of the cycle, which may have been obtained from the pressure determined in step 101 with the help of a pressure-volume characteristic stored in the model arrangement for the corresponding volume storage vessel, as well as on the basis of the exchanged volume calculated in step 107 and thus, based on this volume calculation, the pressure of the storage vessel at the end of the cycle is also determined, again using the pressure-volume characteristic.

This ends one cycle of the method according to the present invention. Control arrangement 10 can use the pressure values obtained to control the valves or the pressure in the brake master cylinder with the help of delivery pump 8.

In each subsequent cycle until the end of the braking action, the method is repeated from step 102, with the pressures calculated in step 108 of the preceding cycle being used as pressures $p_1$, $p_2$, $p_3$ in each subsequent cycle.

According to an alternative embodiment of the method, it is possible to add only those pairs of volume storage vessels to the list whose pressures differ from one another or deviate from one another by more than a specific minimum value.

It is also entirely possible to expand the method described above to systems with more than two peripheral volume storage vessels. For each additional volume storage vessel, one more pressure is simply added to the number of pressures to be initialized in step 101, and additional pairs of connected volume storage vessels can be added to the list compiled in step 103.

In addition, the method is not limited to hydraulic systems having a star-shaped configuration with one central and multiple peripheral storage vessels. The hydraulic system can generally have any topology. In particular, the method according to the present invention can also be used to model systems with a large number of series-connected volume storage vessels, which up to now has been impractical, due to the problem described above of long response times in current models.

Figure 5:
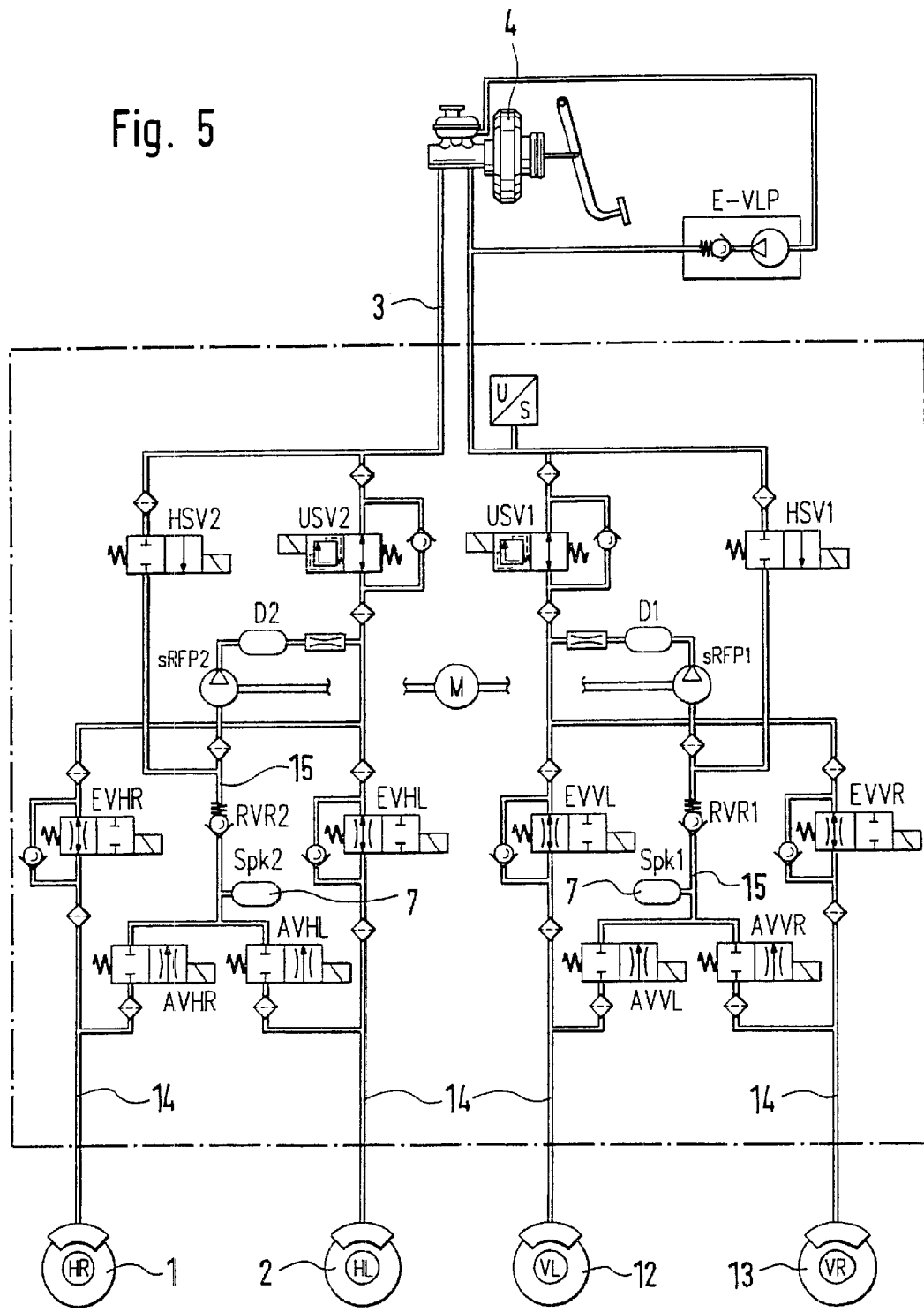
FIG. 5 shows another hydraulic system of a motor vehicle to which the method according to the present invention may be applied.

FIG. 5 shows an example of a specific hydraulic system to which the method according to the present invention can be applied. This system is a motor vehicle brake system that is suitable for use in conjunction with an anti-skid system or with a vehicle dynamics control system in general. It includes a brake master cylinder 4 from which two high-pressure lines 3 extend to four intake valves EVHR, EVHL, EVVL, EVVR via changeover valves USV1, USV2, which are open in the idle state illustrated in the figure. The intake valves are 2/2 solenoid valves, which are also open in the idle state. Brake chambers 1, 2, 12, 13 of four wheels HR, HL, VL, VR are each connected to the output of the assigned intake valve and to an input of an assigned discharge valve AVHR, AVHL, AVVL, AVVR via line sections 14. The discharge valves are also 2/2 solenoid valves, which are closed in the idle state and whose outputs open into two low-pressure lines 15, one for the front wheels and one for the rear wheels of the motor vehicle. Each low-pressure line 15 includes a storage chamber 7 and is connected to a delivery pump sRFP1, sRFP2, which delivers brake fluid from low-pressure line 15 to high-pressure line 3. When the volumetric flow rate of the delivery pump(s) is low in relation to the flow rates of valves EVHR, EVHL, EVVL, EVVR, AVHR, AVHL, AVVL, AVVR while the flow is passing through the valves, volume or pressure changes in the high- and low-pressure lines produced by this volumetric flow rate can be ignored according to the model. However, it is also possible to take into account the delivery pump flow rate known a priori within the context of a volumetric inflow/outflow balance for each volume storage vessel in step 107 of the method described above in conjunction with FIG. 4.

A control arrangement (not illustrated) controls the switching state of each intake and discharge valve individually by selectively exciting its electromagnet.

When the driver presses the brake pedal, the pressure in brake master cylinder 4 increases and consequently also in wheel brake chambers 5, 6, 12, 13 via the open intake valves. When the control arrangement determines, with the aid of a connected sensor, that a wheel, such as wheel HR, is about to lock, it switches intake and discharge valves EVHR and AVHR, respectively, from their idle state to an active state in which intake valve EVHR closes and discharge valve AVHR opens, so that the pressure in wheel brake chamber 1 of wheel HR decreases again.

Once the control arrangement has determined that the wheel is rotating freely again, as a consequence of the decreasing braking pressure, it closes the discharge valve again and gradually increases the pressure in the wheel brake chamber again by briefly opening the intake valve for as long, i.e., as often, as needed before detecting another possible wheel lock.

Braking a vehicle frequently leads to situations in which the various wheels start to lock with the presence of different pressures in the wheel chambers, e.g., when braking when cornering or in the case of different characteristics of the ground beneath the individual wheels. By controlling the pressures in each wheel brake chamber individually, different pressures can occur in the individual wheel brake chambers during the course of the braking action. If it is assumed that the pressures in wheel brake chambers 1 and 2 differ from each other, the method can be used while intake valves EVHR, EVHL are open, with brake master cylinder 4 and high pressure line 3 in this case forming the central volume storage vessel and wheel brake chambers 1, 2 forming peripheral volume storage vessels with corresponding line sections 14. However, the method can also be used with closed intake valves and open discharge valves AVHR, AVHL, with low pressure line 15 and brake fluid reservoir 7 in this case performing the function of the central volume storage vessel.

What is claimed is:

1. A method for providing an estimate of at least one of a pressure change and a volume change in a hydraulic system that includes at least two peripheral volume storage vessels, each of which is connected to a central volume storage vessel by a corresponding one of a plurality of valves, the method comprising the steps of:

providing a model of the hydraulic system in which a direct connection to the at least two peripheral volume storage vessels exists and is independent of whether the at least two peripheral volume storage vessels are simultaneously connected directly to each other; and basing the estimate of at least one of the pressure change and the volume change on the model.

2. The method of claim 1, wherein the hydraulic system does not have a direct connection between the at least two peripheral volume storage vessels.

3. The method of claim 1, wherein the model is employed when each one of the plurality of valves is open.

4. The method of claim 1, wherein the model is employed when pressures in the at least two peripheral volume storage vessels are different.

5. The method of claim 1, wherein the step of estimating is performed in cycles and each cycle includes the steps of:

(a) assuming initial pressures for the central volume storage vessel and the at least two peripheral volume storage vessels;

(b) determining first volumetric flows between the central volume storage vessel and each of the at least two peripheral volume storage vessels based on differences in pressures of the central volume storage vessel and each of the at least two peripheral volume storage vessels;

(c) determining a second volumetric flow between the at least two peripheral volume storage vessels based on a difference in pressures between the at least two peripheral volume storage vessels; and (d) estimating each of the pressures in the central volume storage vessel and the at least two peripheral volume storage vessels based on at least one of the first volumetric flows and the second volumetric flow so as to provide estimated pressures.

6. The method of claim 5, wherein in step (b), the first volumetric flows are determined based on one of a volume coefficient and a volume resistance of each valve, and in step (c), the second volumetric flow is determined based on a total flow resistance of each valve that connects the central volume storage vessel to each of the at least two peripheral volume storage vessel.

7. The method of claim 5, wherein at least one of step (b) and step (c) is performed in accordance with a Bernoulli equation.

8. The method of claim 5, wherein the estimated pressures of step (d) of a cycle are the initial pressures of step (a) of a subsequent cycle.

9. The method of claim 1, wherein a volume of the central volume storage vessel is less than a volume in each of the at least two peripheral volume storage vessels.

10. The method of claim 1, wherein the central volume storage vessel is a pressure line of a brake circuit in a motor vehicle, and each of the at least two peripheral volume storage vessels is a brake chamber in a wheel of the motor vehicle.

11. A braking force control system for use in a motor vehicle having a brake system having a hydraulic system that includes at least two peripheral volume storage vessels, each of which is connected to a central volume storage vessel by a corresponding one of a plurality of valves, comprising:

an arrangement for determining estimates of at least one of a pressure change and a volume change based on a model of the hydraulic system in which a direct connection to the at least two peripheral volume storage vessels exists and is independent of whether the at least two peripheral volume storage vessels are simultaneously connected directly to each other.

12. The system of claim 11, wherein the hydraulic system does not have a direct connection between the at least two peripheral volume storage vessels.

13. The system of claim 11, wherein the model is employed when each one of the plurality of valves is open.

14. The system of claim 11, wherein the model is employed when pressures in the at least two peripheral volume storage vessels are different.

15. The system of claim 11, wherein the arrangement determines the estimates by performing in cycles a method that includes the steps of:

(a) assuming initial pressures for the central volume storage vessel and the at least two peripheral volume storage vessels;

(b) determining first volumetric flows between the central volume storage vessel and each of the at least two peripheral volume storage vessels based on differences in pressures of the central volume storage vessel and each of the at least two peripheral volume storage vessels;

(c) determining a second volumetric flow between the at least two peripheral volume storage vessels based on a difference in pressures between the at least two peripheral volume storage vessels; and (d) estimating each of the pressures in the central volume storage vessel and the at least two peripheral volume storage vessels based on at least one of the first volumetric flows and the second volumetric flow so as to provide estimated pressures.

16. The system of claim 15, wherein in step (b), the first volumetric flows are determined based on one of a volume coefficient and a volume resistance of each valve, and in step (c), the second volumetric flow is determined based on a total flow resistance of each valve that connects the central volume storage vessel to each of the at least two peripheral volume storage vessels.

17. The system of claim 15, wherein at least one of step (b) and step (c) is performed in accordance with a Bernoulli equation.

18. The system of claim 15, wherein the estimated pressures of step (d) of a cycle are the initial pressures of step (a) of a subsequent cycle.

19. The system of claim 11, wherein a volume of the central volume storage vessel is less than a volume in each of the at least two peripheral volume storage vessels.

20. The system of claim 11, wherein the central volume storage vessel is a pressure line of a brake circuit in the motor vehicle, and each of the at least two peripheral volume storage vessels is a brake chamber in a wheel of the motor vehicle.

* * * * *

UNITED STATES PATENT AND TRADEMARK OFFICE
CERTIFICATE OF CORRECTION

PATENT NO. : 6,682,154 B1
DATED : January 27, 2004
INVENTOR(S) : Haeussler et al.

It is certified that error appears in the above-identified patent and that said Letters Patent is hereby corrected as shown below:

Title page,
Item [*] Notice, delete "65" and insert -- 481 --.

Signed and Sealed this

Thirtieth Day of August, 2005

JON W. DUDAS
*Director of the United States Patent and Trademark Office*